United States Patent [19]

Volk, Jr.

[11] Patent Number: 4,751,030

[45] Date of Patent: Jun. 14, 1988

[54] PELLET MILL CONTROLLER WITH AUTOMATIC DIFFERENTIAL TEMPERATURE SELECTION

[75] Inventor: Joseph A. Volk, Jr., Creve Coeur, Mo.

[73] Assignee: Beta Raven Inc., Earth City, Mo.

[21] Appl. No.: 932,618

[22] Filed: Nov. 20, 1986

[51] Int. Cl.[4] .............................................. B29C 67/00

[52] U.S. Cl. .................................. 264/40.6; 264/40.7; 425/144

[58] Field of Search .................... 264/40.6, 40.4, 40.7, 264/141, 142, 40.1; 425/143, 144, DIG. 230, 331; 364/468, 776

[56] References Cited

U.S. PATENT DOCUMENTS

| | | | |
|---|---|---|---|
| 3,707,978 | 1/1973 | Volk, Jr. | 137/2 |
| 3,931,377 | 1/1976 | Dollinger | 264/40.1 |
| 3,932,736 | 1/1976 | Zarow et al. | 325/151.1 |
| 4,120,630 | 10/1978 | LaSpisa et al. | 425/144 |
| 4,168,290 | 9/1979 | Giles | 264/40.6 |
| 4,183,675 | 1/1980 | Zarow | 241/34 |
| 4,340,937 | 7/1982 | Volk, Jr. | 364/468 |
| 4,342,361 | 8/1982 | Volk, Jr. | 165/113 |
| 4,376,623 | 3/1983 | Robinson et al. | 264/40.1 |
| 4,385,016 | 5/1983 | Gwinn | 425/144 |
| 4,463,430 | 7/1984 | Volk, Jr. et al. | 364/468 |
| 4,671,757 | 6/1987 | Volk, Jr. | 425/144 |
| 4,678,424 | 7/1987 | Volk, Jr. et al. | 425/331 |
| 4,700,310 | 10/1987 | Volk, Jr. | 364/468 |

FOREIGN PATENT DOCUMENTS

| | | | |
|---|---|---|---|
| 2462990 | 3/1981 | France | 264/40.6 |

*Primary Examiner*—Richard V. Fisher
*Assistant Examiner*—Coreen Y. Lee
*Attorney, Agent, or Firm*—Rogers, Howell, Moore & Haferkamp

[57] ABSTRACT

A pellet mill controller includes a plurality of temperature sensors to sense the temperature of material as it traverses the pellet mill, and a temperature sensor for sensing the temperature of the die to determine when it reaches the approximate nominal boiling point of water. As the die reaches the approximate nominal boiling point of water, the differential is measured between two of the temperature sensors and stored in the pellet mill to control the pellet mill in accordance with temperature differential control modes previously patented.

14 Claims, 1 Drawing Sheet

PELLET MILL CONTROLLER WITH AUTOMATIC DIFFERENTIAL TEMPERATURE SELECTION

BACKGROUND AND SUMMARY OF THE INVENTION

The inventor herein is also the inventor of several patents related to controlling a pellet mill, including U.S. Pat. Nos. 3,932,736; 4,340,937; and 4,463,430, as well as several patent applications, including Ser. No. 06/848,219 now U.S. Pat. No. 4,700,310, filed Apr. 4, 1986 and Ser. No. 06/907,232, filed Sept. 15, 1986, which are presently pending which further disclose and claim controllers and control modes for the pelleting process. The disclosures of these prior patents and applications are incorporated herein by reference. As detailed more fully and completely therein, various control algorithms have been previously developed which have been found to perform very satisfactorily in pelleting various formulations of material. The first of these developed is the so-called "ΔT" control algorithm as is disclosed and claimed in U.S. Pat. No. 3,932,736. The basic concept of this control algorithm is that the temperature of the material is sensed at a first point prior to the addition of moisture and then at a second point after moisture has been added to the material and just prior to its entering the pellet producing means. The temperature differential between these two points is then determined and controlled as a means of producing pellets having a desired moisture content within a prescribed range. Still another control algorithm measures and controls the temperature differential across the pellet producing means and is commonly referred to as "ΔT mill" as is disclosed and claimed in U.S. Pat. No. 4,340,937. Both of these control algorithms have met with tremendous acceptance and success in the industry and form the basis for automatic controls controlling many pelleting operations throughout the world.

Although both of these control algorithms have been previously developed and are in widespread use, there remains some minor difficulty in determining the exact temperature differential which should be utilized in any particular installation as well as with any particular type of feed. As can be appreciated by those of ordinary skill in the art, the amount of moisture in the material being fed to the pellet mill varies, as well as the die quality and the amount of wear previously experienced by the die as is evidenced in the amount of frictional energy generated in the mill which affects the temperature readings. Although measurements and calculations can be made to properly determine the temperature differential to be used with either of the control algorithms mentioned herein, this process does take some degree of sophistication and accurate measurement, and does represent a continuing need to rely upon the ability and skill of an operator.

One of the later developments of the inventor herein includes the concept of utilizing a non-contacting temperature probe to measure the temperature of the die as the pellet is formed, and the use of that single point temperature measurement to control the pelleting process. This development is the subject of several of the pending patent applications mentioned above and represents an exciting new advance by the inventor herein in developing still another control algorithm. As such, the single point non-contacting temperature probe or "pellet temp" control algorithm holds great promise for further sophistication in controlling the pelleting process. However, the inventor herein has found still another advantage to the non-contacting, single point die temperature probe in helping to solve the calculation and measurement problem previously experienced in determining proper temperature differentials for utilizing the ΔT and ΔT mill control modes. The inventor has found that by bringing the pellet mill up to temperature by measuring the temperature of the die until the die reaches the nominal change of phase point of water (boiling point), and at that point then measuring the temperature values at their appropriate locations, these temperature values can then be used to monitor and control the pellet mill in accordance with one of the prior control modes, i.e. ΔT or ΔT mill. Of course, this further automates the pelleting process in that it makes it possible for an operator to merely turn on the controller, and the controller can bring the pellet mill up to speed, monitor the temperature of the die, and at the point that the die reaches the pre-determined temperature measure the temperature at the other temperature sensors. The controller can then automatically use those measured temperature values as the desired values in continuing the pellet run under the ΔT or ΔT mill control algorithm. Thus, still another step in the process is removed from control of the operator and placed in the hands of automatic machinery to further mechanize and optimize the pelleting process. This method provides the further advantage of compensating for the idiosyncratic characteristics of the particular die, a parameter which is virtually impossible to independently determine, as well as the other more commonly determined values of moisture content of the material and ambient temperature.

The principal advantages and features of the invention have been briefly described. For a more thorough understanding of the invention, please refer to the drawing and description of the preferred embodiment which follows.

DETAILED DESCRIPTION OF THE PREFERRED EMBODIMENT

Figure 1:
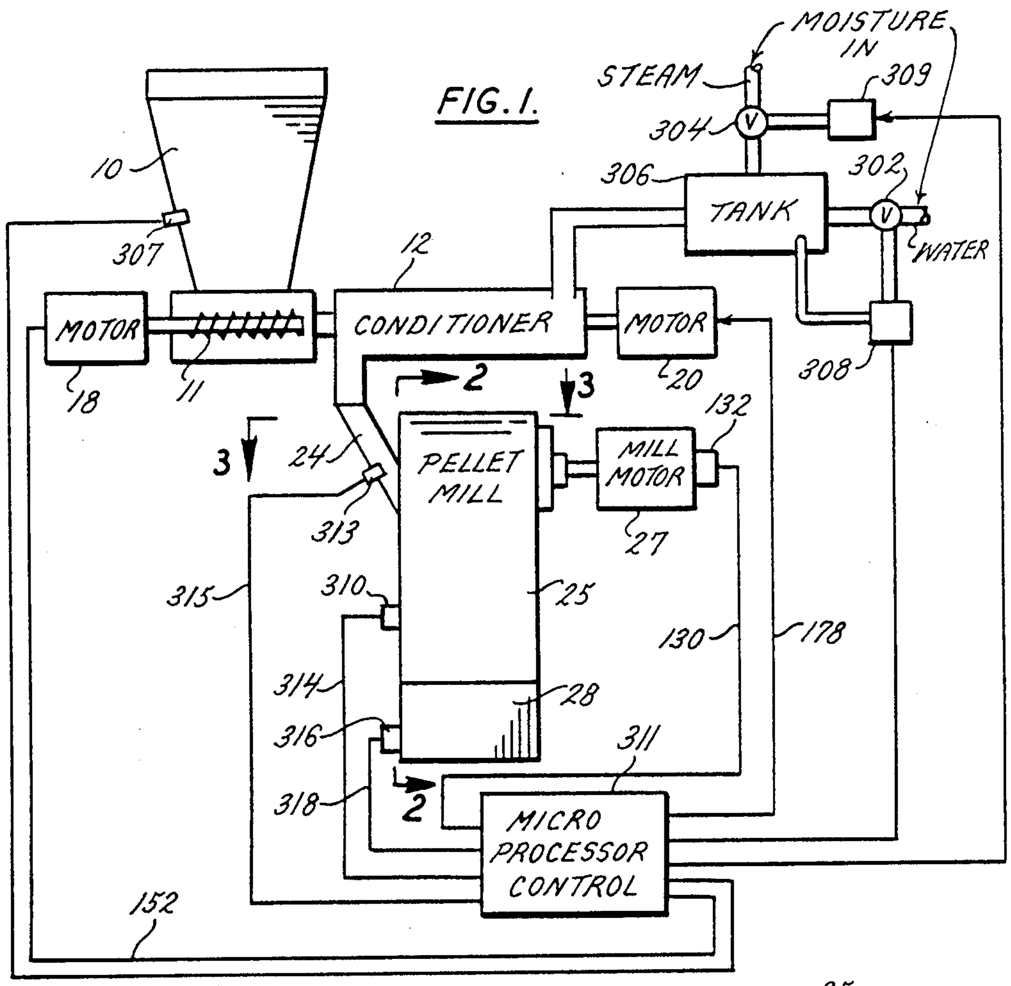
FIG. 1 is a representational view of a pellet mill with a controller connected thereto for performing the method of the present invention.

An automatic control for a pellet producing apparatus according to this invention is shown schematically in FIG. 1. The pellet mill includes many of the same elements as that shown in FIG. 1 of the inventor's prior U.S. Pat. No. 4,340,937, and the control is essentially the microprocessor control shown and described in the inventor's prior U.S. Pat. No. 4,463,430 except that one of the temperature sensors has been modified according to the improvement of the invention disclosed in Ser. No. 907,232 to sense (1) the temperature of the die, or (2) the pellets immediately as they emerge from the die, or (3) some average therebetween, temperature control has been added to the moisture input, and a moisture meter has been added to the cooler, all as described below.

In FIG. 1, there is shown a bin 10 for holding a supply of material from which pellets are to be made. In the case of the feed pellets, the material is preferably in milled form and is composed from any of a great variety of animal feed formulations including the numerous ones most commonly used in the art. The milled material is fed by means of an appropriate feed screw 11, auger, gravimetric feeder, or the like, into a conditioner 12. The feed screw 11 is operated, or made to rotate, by means of a variable speed screw motor 18. The conditioner includes rotating paddles or the like to agitate and add turbulence to the material as the material moves therethrough. A motor 20 operates the agitator.

Figure 2:
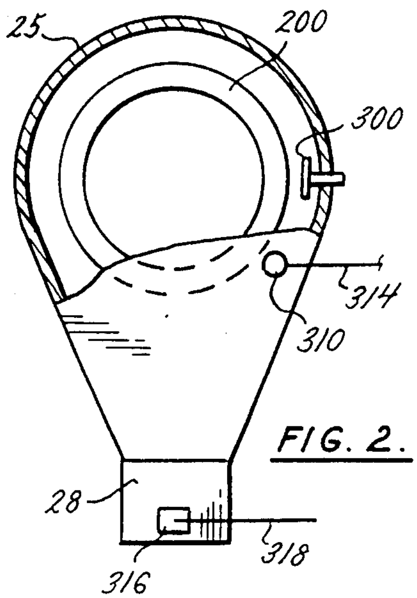
FIG. 2 is a cross-sectional view of the pellet mill producing means taken along the plane of line 2—2 in FIG. 1 partially broken away to show the die.

From the conditioner, the material is fed down a chute 24 and into a pellet mill or pellet producing means 25. The pellet mill 25 might, for example, be of the die type and comprise a rotating cylindrical die 200 (FIGS. 2 and 3) with radial holes therein and rollers mounted within the die. The material is fed into the cylinder and by interaction of the die 200 and rollers contained therein (not shown) is forced through the holes in the die 200 and severed by knife 300 to form pellets. The pellet mill is operated by a relatively high horsepower electric motor 27. After severing, the pellets fall through an opening 28 at the bottom of the mill.

Means are provided for supplying one or more moisture controlling ingredients to the material within the conditioner. These ingredients might include, for example, steam, water, dry heat, or some other suitable moisture controlling ingredient. As shown in the preferred embodiment, the flow of water may be controlled by a valve 302, steam by a valve 304, and both fed into a tank 306 where they are mixed prior to being added to the mixture in conditioner 12. Motors 308 and 309 control the relative positions of these valves to control the temperature of the moisture as it is added.

The microprocessor control 311 may be similar to the inventor's prior controller shown and described in his prior U.S. Pat. No. 4,463,340. The control 311 has outputs 152 and 178 to the feed screw motor 18 and conditioner motor 20 for controlling the rate of flow of feed and the mixing of moisture therewith as desired. Also, a transducer 132 is coupled to the mill motor 27, and a signal representing the load on the motor is carried by a conductor 130 to an input of the control 311. A first temperature sensor 307 is mounted to the bin 10 and senses the temperature of the material therein which is communicated to the control 311 through its associated conductor. A temperature sensor 313 is mounted at the input to the pellet mill (or, the output of the input section) and a conductor 315 carries this signal back to control 311. A non-contacting temperature probe 310 is mounted in the pellet mill 25 and preferably aligned at an acute angle to the face 312 of die 200 so that it detects the temperature of the die face 312, or pellets immediately upon their emergence from the holes in the die face 312, or an average value of these two temperatures, as desired. For simplicity, this temperature will be referred to as the die temperature in the claims. A conductor 314 carries this signal back to control 311. A third temperature sensor 316 is mounted near the output of the pellet mill 25 and senses the temprature of pellets after they are produced with conductor 318 communicating that information to control 311. Control 311 can use these temperature values in controlling motors 308, 309 and valves 302, 304 to either increase or decrease moisture flow into conditioner 12 in response to an increase or decrease in the sensed temperatures, or temperature differential between any two sensors. The control 311 also can change the feed rate of material by controlling motors 18, 20. The microprocessor control 311 is very versatile and provides a multitude of operating modes, all as shown and described in U.S. Pat. No. 4,463,340, the disclosure of which is incorporated herein by reference.

Figure 3:
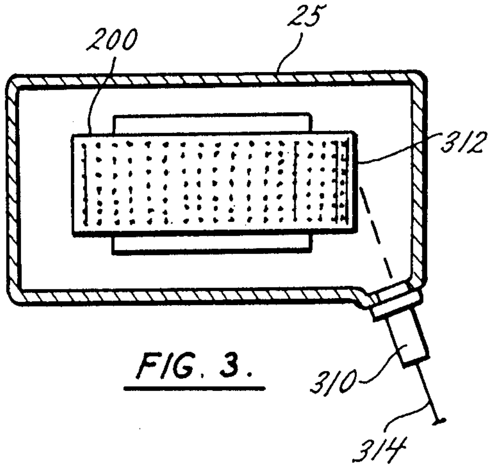
FIG. 3 is a cross-sectional view taken along the plane of line 3—3 in FIG. 1 further detailing the die and placement of a temperature sensor to sense the temperature of the die.

The sensor 310 for measuring the temperature of the die can be any temperature measuring device including thermocouples or thermistors. Preferably, however, the sensor is a non-contacting temperature sensor, such as an infrared non-contacting temperature sensor. This probe is installed at any convenient spot where infrared energy from the face of the die can reach the sensor. For optimum performance, the sensor should be aimed to sense across the outside face of the die to sense the temperature of the pellets immediately as they exit the die, as shown in FIG. 3. For example, the sensor can be mounted on the outer door of a mill on the upper right-hand quadrant. The output of the sensor is an analog voltage which is fed into the control 311.

In accordance with the present invention, the apparatus disclosed can be used to determine the initial set points for controlling the pellet mill in any one of several different control modes previously disclosed, claimed, and patented in the patent applications and issued patents mentioned herein. For example, using temperature sensors 307, 313, "ΔT" control can be utilized to control the pelleting process. The set points for determining the proper "ΔT" can be determined by bringing the temperature of the die as sensed by temperature sensor 310 up to the nominal boiling point of water, or a few degrees higher (e.g. 2° F., and then determining at that point the difference in temperature between temperature sensors 307 and 313. After these set points are determined, the absolute die temperature may be ignored as the control 311 instead utilizes the set point. This temperature differential can then be used by control 311 to control the input of moisture to maintain that temperature differential through a pelleting run. Thus, the control 311 can automatically determine the correct temperature differential independently of any operator input and perform a pelleting run with even less operator involvement than before. Similarly, the same method can be utilized to run in the "ΔT mill" control mode by utilizing temperature sensors 313, 316 to measure ΔT mill and by utilizing temperature sensor 310 to determine that point in time at which the temperature differential is to be measured.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A method for producing pellets with a pellet mill, said pellet mill having a die through which material is pressed to form pellets, said material being comprised of a plurality of ingredients, said method comprising the steps of bringing the temperature of the die up to approximately the nominal boiling point of water, sensing the temperature of the material at a plurality of locations in the pellet mill with a plurality of temperature sensors as the die reaches said nominal boiling point, determining a desired temperature differential by comparing the output of two of said temperature sensors, and controlling the input of ingredients to the pellet mill to maintain said desired temperature differential.

2. The method of claim 1 wherein the pellet mill has an input section with one temperature sensor being located near the top of the input section and a second temperature sensor being located near the bottom of the input section, the step of controlling the input of ingredients including the step of maintaining the temperature differential between said first and second temperature sensors.

3. The method of claim 1 wherein the pellet mill further comprises a pellet producing means, the pellet producing means at least partially including the die, and a pair of temperature sensors associated with the pellet producing means, one being positioned near the input thereof and the other being positioned near the output thereof, the step of controlling the input of ingredients including the step of maintaining the temperature differential between said pair of temperature sensors.

4. A method for producing pellets with a pellet mill, said pellet mill including a pellet producing means, the pellet producing means including a die through which material is pressed to form pellets, and means for feeding a supply of material to the producing means, the method comprising the steps of elevating the temperature of the material to bring the temperature of the die up to approximately the nominal boiling point of water, sensing the temperature of the material at a first location prior to entering the pellet producing means, sensing the temperature of the material at a second location as it enters the pellet producing means, and controlling the input of ingredients to the pellet mill to maintain the temperature differential between said first and second temperature sensors which exists at the point that the temperature of the die reaches the nominal boiling point of water.

5. The method of claim 4 wherein the step of elevating the temperature of the material includes the step of adding moisture to the material, said moisture being comprised of hot water and steam.

6. The method of claim 5 wherein the die temperature is brought up to approximately 2° F. above the nominal boiling point of water.

7. The method of claim 6 wherein the step of controlling the input ingredients to the pellet mill to maintain the temperature differential includes the step of controlling the input of moisture.

8. The method of claim 4 further comprising the step of ignoring the die temperature once the correct temperature differential has been determined.

9. A method for producing pellets with a pellet mill, said pellet mill having a pellet producing means including a die through which material is pressed to form pellets, said method comprising the steps of conditioning the material by adding moisture in the form of hot water and steam to elevate its temperature, feeding said material to the pellet producing means to thereby elevate the temperature of the die, raising the temperature of the material until the temperature of the die reaches approximately the nominal boiling point of water, sensing the temperature of the material just prior to entering the pellet producing means, sensing the temperature of the material just as it leaves the pellet producing means, and controlling the input of moisture to the material to maintain the temperature differential across the pellet producing means as measured at the point that the die temperature reaches the nominal boiling point of water.

10. The method of claim 9 further comprising the step of ignoring the temperature of the die after the temperature differential has been determined.

11. The method of claim 10 wherein the temperature of the die is raised to approximately 2° F. above the nominal boiling point of water.

12. An automatic control for a pellet mill, the pellet mill having a die through which material is pressed to form pellets, the control comprising means to sense the temperature of the material at a plurality of locations in the pellet mill, means to sense the temperature of the die, means to determine a desired temperature differential by comparing the output of two of said temperature sensors at the time that the die temperature is approximately equal to the nominal boiling point of water, and means to control the input of ingredients to the pellet mill to maintain said desired temperature differential.

13. The device of claim 12 wherein the pellet mill further comprises an input section, the temperature sensing means including means to sense the temperature of the material near the input and output of the input section, the input section temperature sensors being those compared by the desired temperature differential determining means.

14. The device of claim 12 wherein the pellet mill further comprises a pellet producing means, the pellet producing means at least partially including the die, the temperature sensing means including means to sense the temperature of the material near the input and output of the pellet producing means, the pellet producing means temperature sensors being those compared by the desired temperature differential determining means.

* * * * *